United States Patent [19]

Baxter

[11] Patent Number: 5,470,096
[45] Date of Patent: Nov. 28, 1995

[54] WHEELED VEHICLE SUSPENSION

[75] Inventor: Bobby G. Baxter, Warrenton, Mo.

[73] Assignee: The Binkley Company, Warrenton, Mo.

[21] Appl. No.: 376,287

[22] Filed: Jan. 23, 1995

Related U.S. Application Data

[63] Continuation of Ser. No. 217,796, Mar. 25, 1994, abandoned.

[51] Int. Cl.⁶ .................................................. B60G 11/02
[52] U.S. Cl. ........................ 280/712; 280/718; 267/241
[58] Field of Search .................................. 280/711, 712, 280/713, 718; 267/229, 241, 31, 32

[56] References Cited

U.S. PATENT DOCUMENTS

| | | | |
|---|---|---|---|
| 3,309,107 | 3/1967 | Chieger | 280/124 |
| 3,434,734 | 3/1969 | Poulos | 280/124 |
| 3,494,609 | 2/1970 | Harbers | 267/52 |
| 3,531,099 | 9/1970 | King | 267/56 |
| 4,379,572 | 4/1983 | Hedenberg | 280/711 |
| 4,397,478 | 8/1983 | Jensen et al. | 280/711 |
| 5,088,758 | 2/1992 | Wall et al. | 280/683 |

OTHER PUBLICATIONS

New Fruehauf Air–ride Suspension (no date).

Primary Examiner—Richard M. Camby
Assistant Examiner—Christopher P. Ellis
Attorney, Agent, or Firm—Senniger, Powers, Leavitt & Roedel

[57] ABSTRACT

An air-ride suspension for a vehicle comprising a pair of leaf springs, plates and an axle clamped to the springs, a cross-beam secured at its ends to the plates spanning the leaf springs and a pair of air bags interposed between bottom plates on the cross-beam and top plates at the bottom of the vehicle.

18 Claims, 11 Drawing Sheets

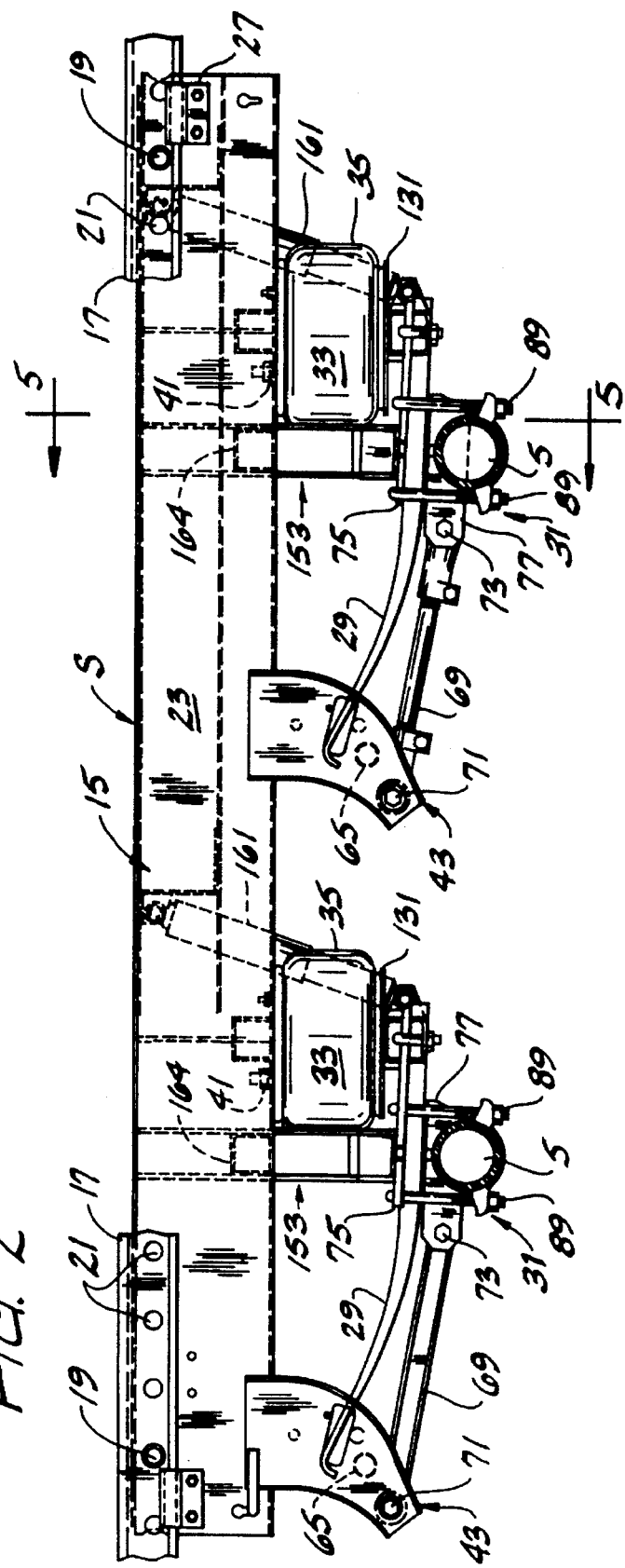

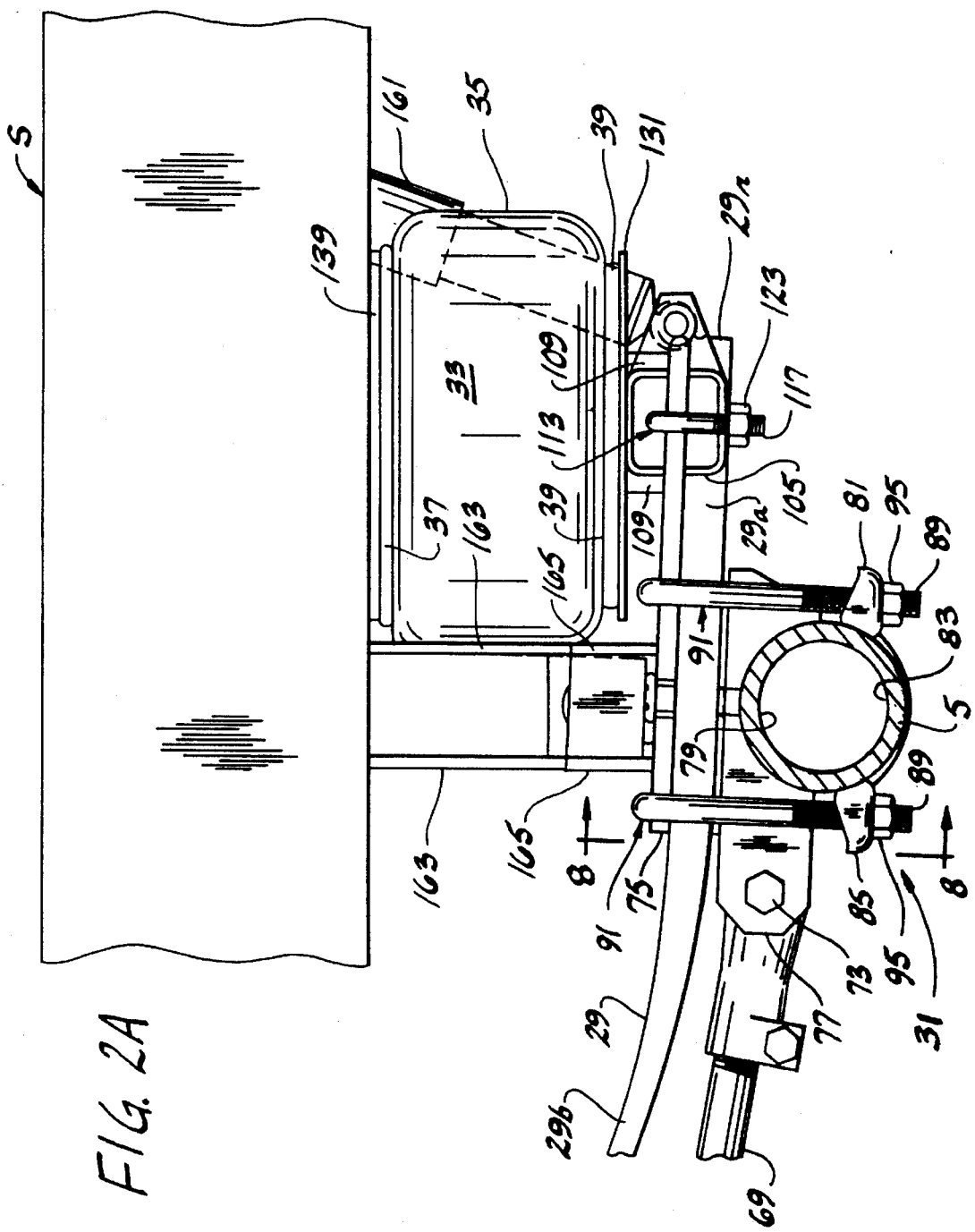

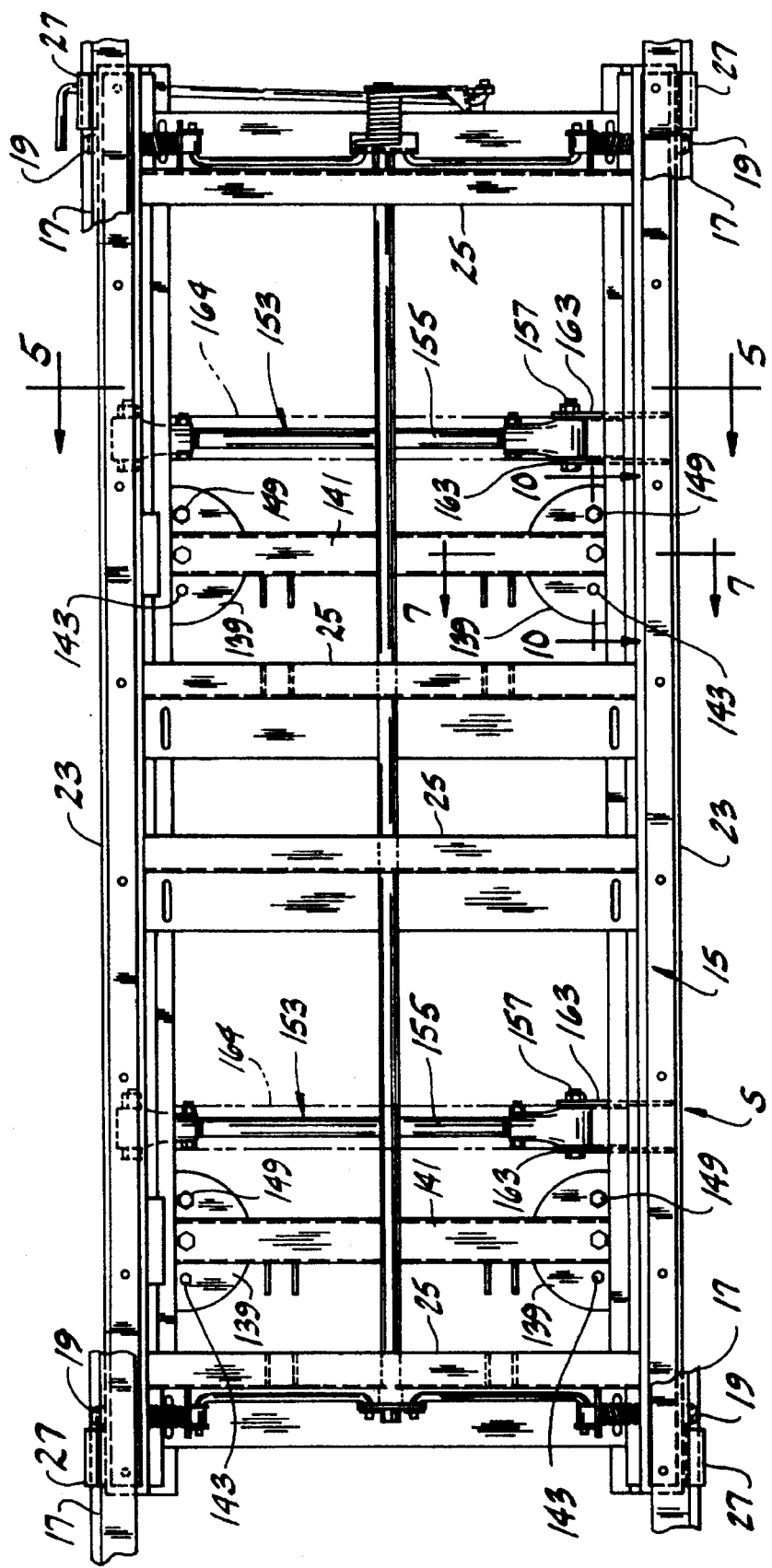

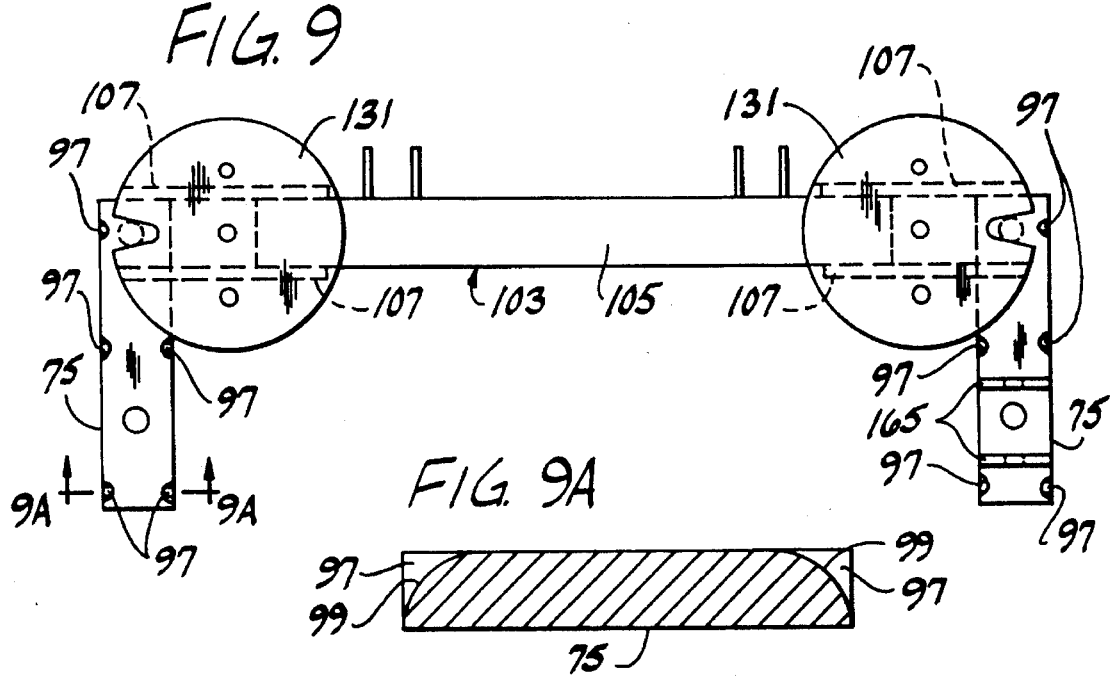
FIG. 9
FIG. 9A
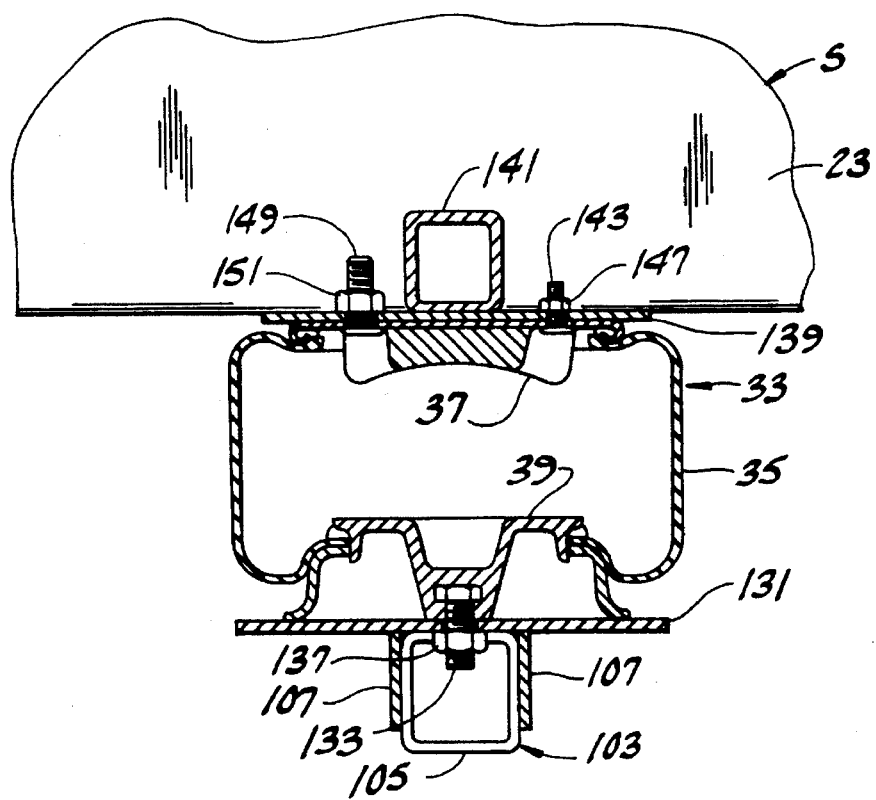
FIG. 10

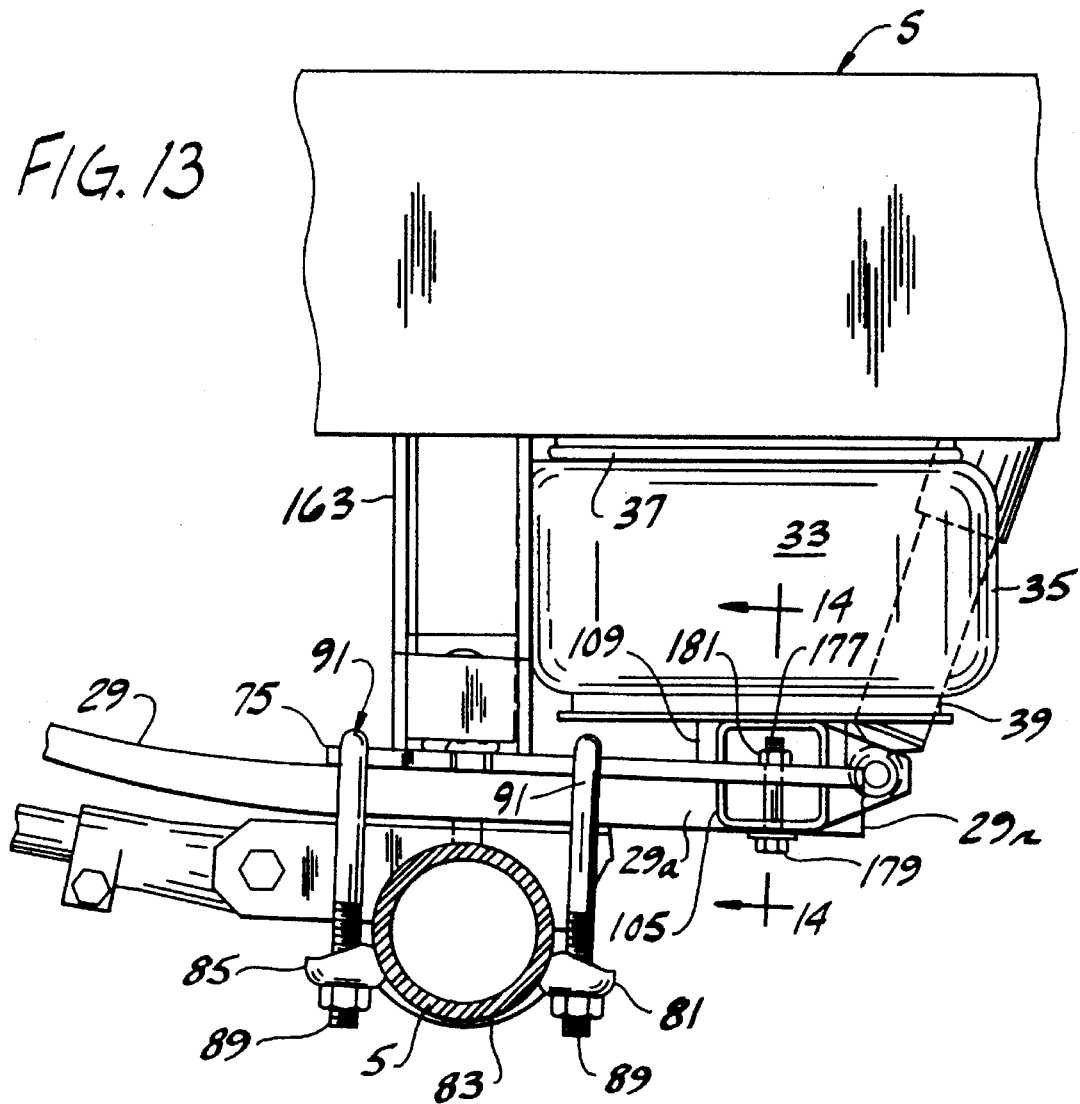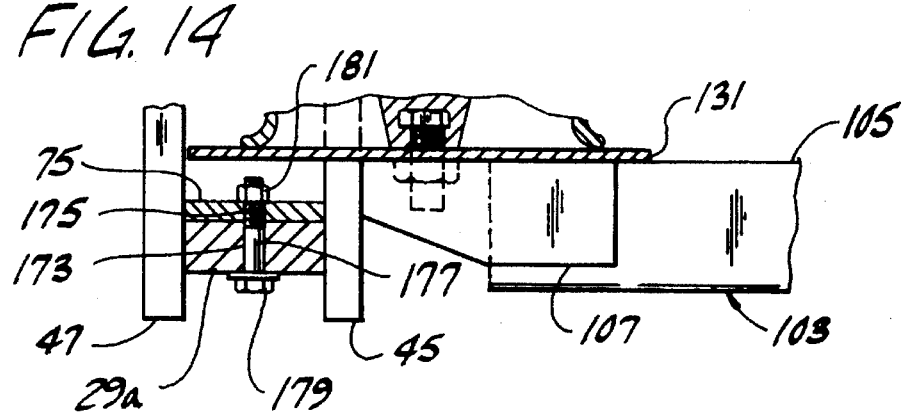

5,470,096

1

WHEELED VEHICLE SUSPENSION

This is a continuation of application Ser. No. 08/217,796 filed on Mar. 25, 1994, now abandoned.

BRIEF SUMMARY OF THE INVENTION

This invention relates to wheeled vehicle suspensions, and more particularly to such suspensions of the type referred to as air-ride suspensions, i.e., suspensions including air bags or air cushions acting as springs in the suspension.

The invention is especially directed to an air-ride suspension for semi-trailers, but it will be understood that air-ride suspensions of the invention may be used for vehicles other than semi-trailers, among the several objects of the invention being noted the provision of a suspension utilizing air cushioning for a soft ride with the suspension being of relatively low weight for more economical over-the-road travel of the vehicle; the provision of such a suspension of economical construction with respect to parts and with respect to assembly of the parts for economy in manufacture; and the provision of such a suspension particularly useful in conjunction with a slider mounted on the bottom of the vehicle enabling adjustment of the suspension longitudinally with respect to the vehicle.

In general, an air-ride suspension of this invention comprises a pair of hangers, one adjacent each side of the vehicle, extending down below the bottom of the vehicle coplanar in a vertical transverse plane of the vehicle. Each of the hangers comprises a pair of side members with a space therebetween and an upper and lower member spanning said space defining an opening. A pair of leaf springs are provided, one adjacent each side of the vehicle below the bottom of the vehicle. Each of these leaf springs extends longitudinally with respect to the vehicle and has one end constituting its forward end extending through the opening in a respective hanger. An elongate plate is mounted on top of each leaf spring. Each of these elongate plates has a width generally corresponding to the width of the leaf spring, and is of such length and so disposed on the respective leaf spring as to overlie a portion of the length of the spring toward the rearward end of the spring with the side edges of the elongate plate generally coplanar with the side edges of the respective spring. An axle extends transversely of the vehicle below the bottom of the vehicle having end portions extending below the leaf springs and below forward end portions of said elongate plates, means being provided for fastening each end portion of the axle to the bottom of the respective leaf spring and fastening said forward end portion of each of said elongate plates on top of the respective leaf spring. A cross-beam extends transversely of the vehicle below the bottom of the vehicle spanning the leaf springs and having end portions bearing on the said elongate plates adjacent the rearward ends of said elongate plates and secured to said elongate plates. Means is provided for fastening the rearward ends of the elongate plates on top of the leaf springs adjacent the end portions of the cross-beams. For air-ride purposes, the suspension includes a pair of air cushions, one adjacent each side of the vehicle below the bottom of the vehicle, interposed between the cross-beam and the bottom of the vehicle. The cross-beam has secured thereon adjacent the ends thereof a pair of plates, one adjacent each end of the cross-beam, each constituting a bottom for the respective air cushion. A pair of plates is provided one adjacent each side of the vehicle and carried by the vehicle below the bottom of the vehicle, each constituting a top plate for the respective air cushion. Further, the suspension includes a pair of torque arms, one adjacent each side of the vehicle, each extending longitudinally with respect to the vehicle and having a forward end and a rearward end, and each extending at its forward end into the space between the side members of a respective forward hanger and pivoted at its forward end therein for swinging movement about a first horizontal axis transverse to the vehicle below the said lower member of the hanger and pivotally connected at its rearward end to the axle for swinging movement about a second horizontal axis parallel to the first, and means for limiting transverse displacement of said leaf springs and up and down movement of said leaf springs.

In one phase of the invention, the means for limiting transverse displacement of and up and down movement of the leaf springs comprises a torque arm extending transversely with respect to the vehicle below the bottom of the vehicle pivoted at one end with respect to the bottom of the vehicle for swinging movement about a first generally horizontal axis which extends longitudinally with respect to the vehicle adjacent one side of the vehicle below the bottom of the vehicle, and pivotally connected at its other end to the elongate plate on the leaf spring adjacent the other side of the vehicle for swinging movement about a second generally horizontal axis parallel to said first horizontal axis for limiting transverse movement of the leaf springs, and supplemental means for limiting up and down movement of the leaf springs.

In another phase of the invention, the means for limiting transverse displacement and up and down movement of said leaf springs comprises means fixed with respect to the bottom of the vehicle extending down from the bottom of the vehicle in a transverse vertical plane of the vehicle located adjacent the rear ends of the leaf springs and between the air cushions and the rear ends of the leaf springs for limiting transverse displacement of the leaf springs while allowing up and down movement of the rearward ends of the leaf springs.

Other objects and features will be in part apparent and in part pointed out hereinafter.

BRIEF DESCRIPTION OF THE DRAWINGS

FIG. 2 is an enlarged fragment of FIG. 1 showing the two suspensions and a slider on which the suspensions are mounted, the wheels being omitted;

FIG. 2A is an enlarged fragment of FIG. 2;

FIG. 3 is a plan of FIG. 2;

FIG. 9 is a plan of a subassembly of parts for the manufacture of a suspension;

FIG. 9A is an enlarged section on line 9A—9A of FIG. 9;

FIG. 10 is an enlarged vertical longitudinal section on line 10—10 of FIG. 3;

FIG. 13 is a view similar to the right-hand part of FIG. 2A showing a modification; and FIG. 14 is a view in vertical section on line 14—14 of FIG. 13.

Corresponding reference characters indicate corresponding parts throughout several views of the drawings.

DETAILED DESCRIPTION

Figure 1:
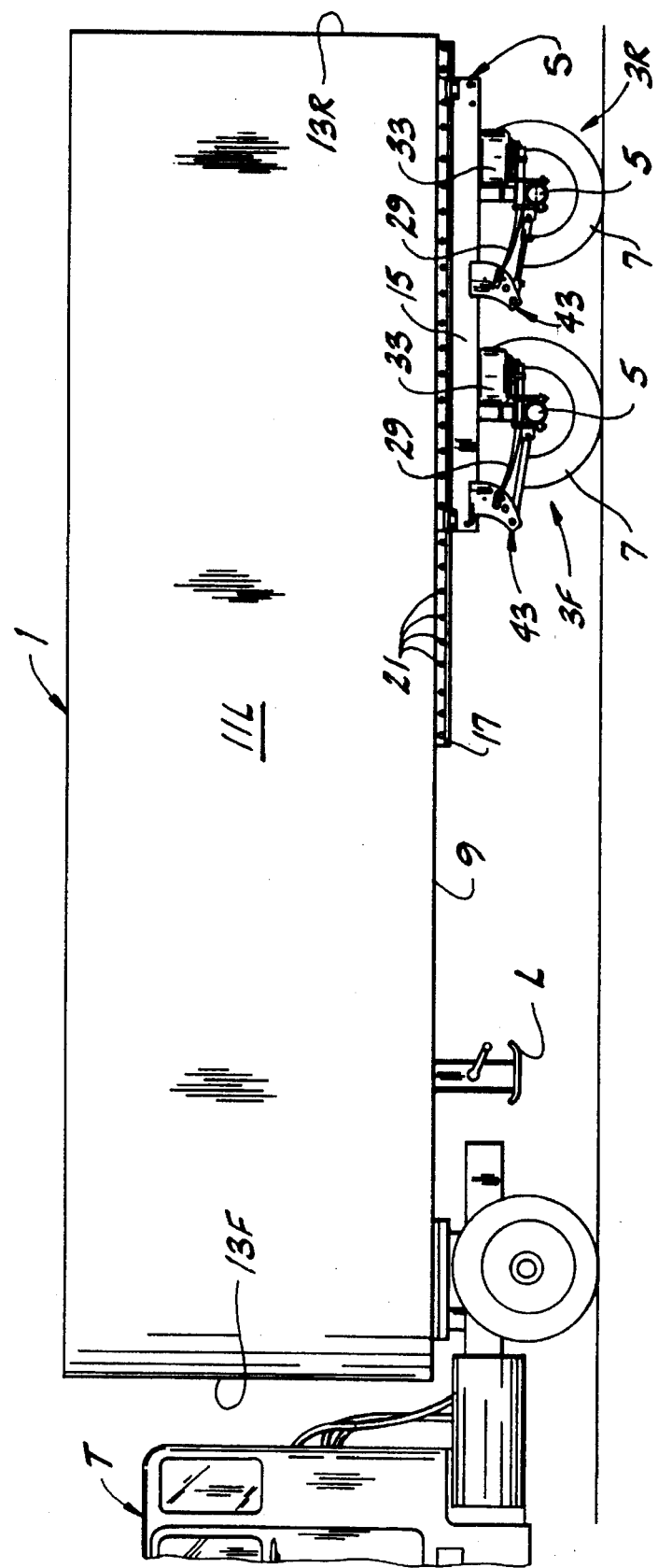
FIG. 1 is a view in side elevation of a semi-trailer (more particularly, a van) equipped with a tandem axle suspension comprising two suspensions of this invention, with the wheels on the near side of the suspensions removed to show detail, and including a showing of a tractor for pulling the semi-trailer.
Figure 4:
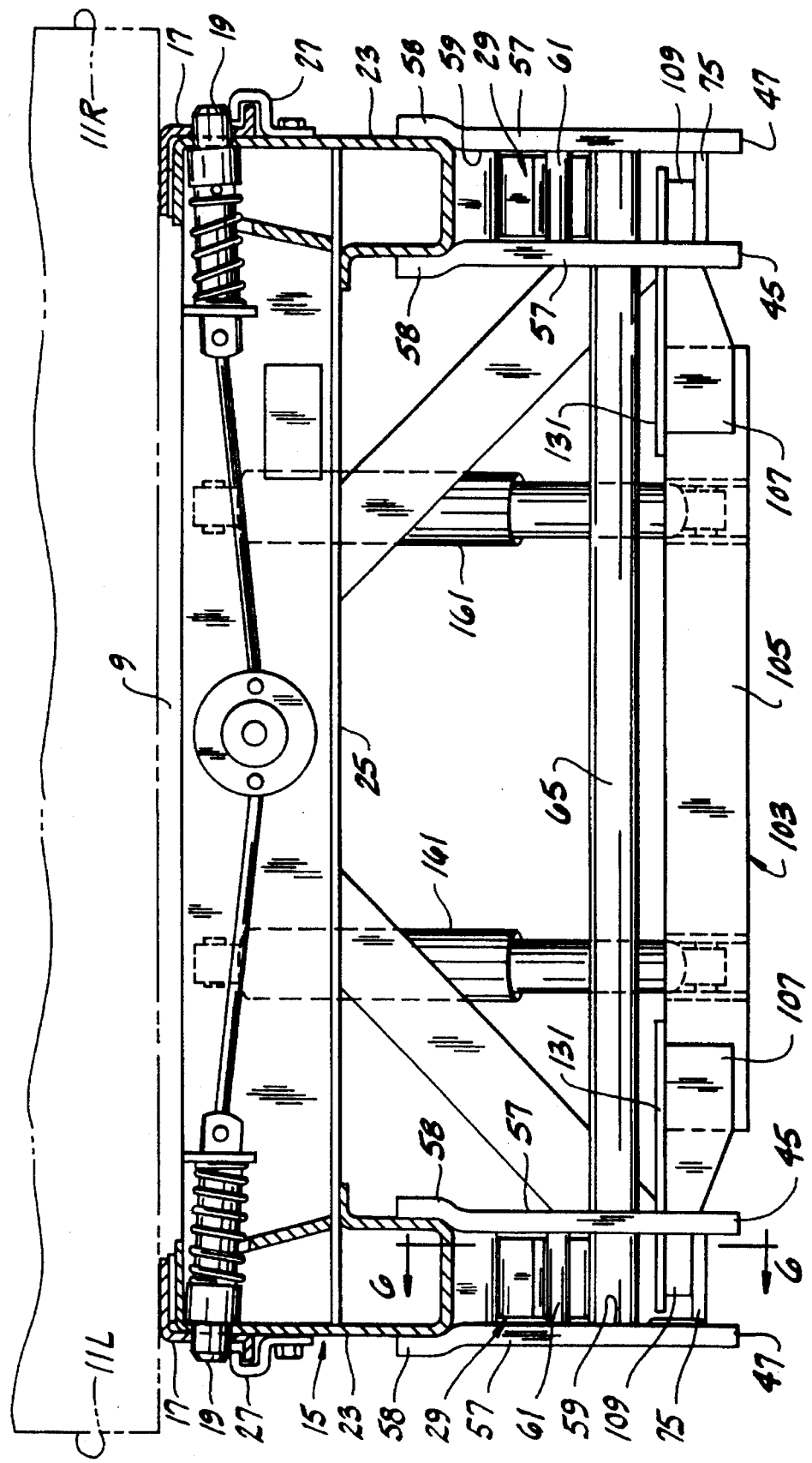
FIG. 4 is a view of the left end of FIG. 3, with parts omitted and parts shown in section.

Referring to the drawings, first more particularly to FIG. 1, a wheeled vehicle, more particularly a semi-trailer indicated in its entirety by the reference numeral 1, is shown with a forward air-ride suspension 3F and a rearward air-ride suspension 3R adjacent its rear end for two axles in tandem for the wheels of the vehicle. The axle of each suspension is designated 5. Wheels on the ends of the axles are indicated at 7. The semi-trailer, as illustrated, is a van, the bottom of the van being indicated at 9, its left and right sides being designated 11L and 11R (see FIG. 4) and its forward and rearward ends being designated 13F and 13R. The semi-trailer is shown with its forward end coupled to a tractor T, and has a landing gear such as indicated at L.

The suspensions 3F and 3R may be either fixedly secured directly to the bottom of the van, without the capability of adjustment of their position longitudinally with respect to the van, or they may be mounted for adjustment longitudinally of the van by means of a slider and particularly a lightweight slider such as that sold under the trademark LITE-SLIDE by The Binkley Company, of Warrenton, Mo., the assignee of this invention. Reference may be made to The Binkley Company's U.S. Pat. No. 4,838,566 issued Jun. 13, 1989 for such a slider, this patent being incorporated herein by reference. As herein illustrated, the two suspensions are mounted for conjoint adjustment longitudinally of the bottom of the van by means of such a slider, indicated in its entirety at S in FIGS. 1–5 and comprising a frame generally designated 15 slidable longitudinally on the bottom 9 of the van on left and right side rails each designated 17 which are affixed to the bottom of the van, the frame being adapted to be locked in various positions of adjustment endwise of the bottom of the van by locking pins such as indicated at 19 engageable in holes 21 of a series of holes in the rails. Basically, the slidable frame 15 comprises left and right side members each designated 23 and cross members such as indicated at 25 with the side members mounted as indicated at 27 for sliding movement on the rails 17. Reference may be made to said U.S. Pat. No. 4,838,566 for further details.

Figure 8:
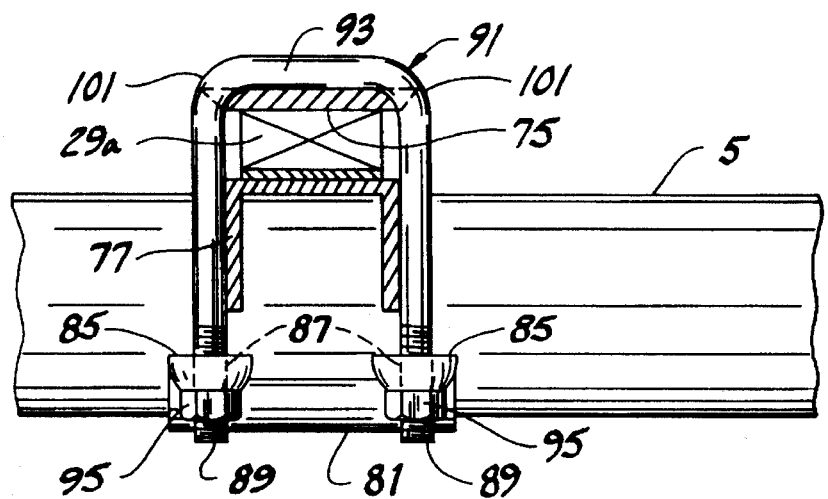
FIG. 8 is an enlarged vertical transverse section on line 8—8 of FIG. 2A.

The forward and rearward air-ride suspensions 3F and 3R are identical, and a description of one will suffice for both. Thus, each suspension comprises a pair of leaf springs, one adjacent each side of the van below the bottom of the van, each designated 29. These springs are positioned one opposite the other adjacent opposite sides of the van, each extending longitudinally with respect to the van. Each spring is a low arch leaf spring, the rearward half 29a of the length of the spring being flat and the forward half 29b curved upwardly. The forward end of each spring is designated 29f, the rearward end 29r. The axle 5 extends transversely between the two springs 29 and is secured adjacent each of its ends to the springs as indicated at 31, in a manner to be more particularly described, located between the forward and rearward ends of the springs, somewhat rearward of the center of length of the springs and adjacent the forward end of the flat rearward half 29a of the springs. For a soft ride, the suspension includes a pair of air cushions, each designated 33, one adjacent each side of the bottom of the van, each air cushion being disposed between a respective leaf spring and the bottom of the van. Each air cushion, which may be of the type comprising a natural rubber bag 35 having upper and lower end heads 37 and 39 (see particularly FIGS. 8 and 10) such as that sold under the trade name Super-Cushion by Goodyear Tire and Rubber Company of Akron, Ohio, is disposed between a respective leaf spring and the bottom of the van. They are located in a vertical transverse plane of the van, each being located adjacent the rearward end 29r of the respective leaf spring 29.

Figure 6:
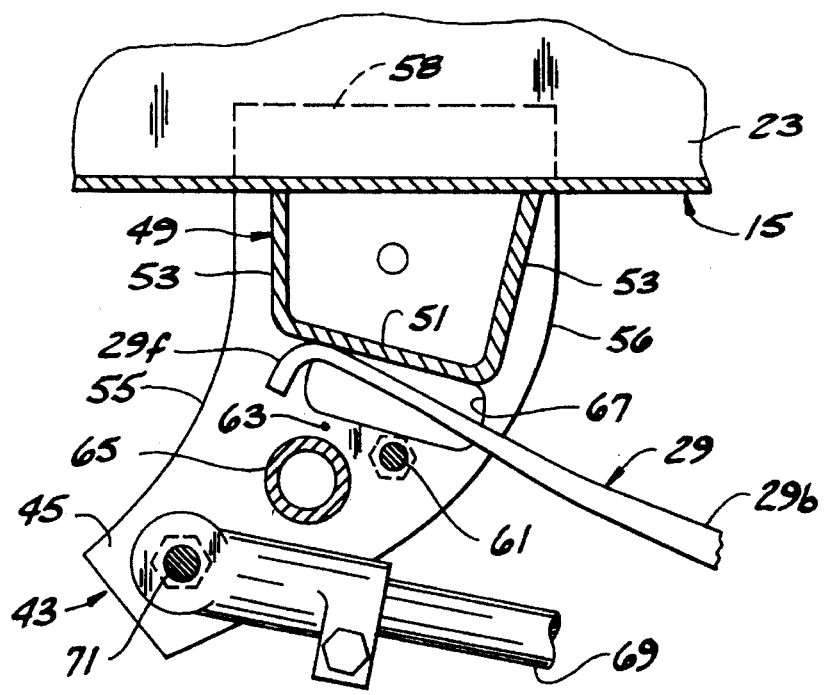
FIG. 6 is an enlarged section on line 6—6 of FIG. 4.
Figure 7:
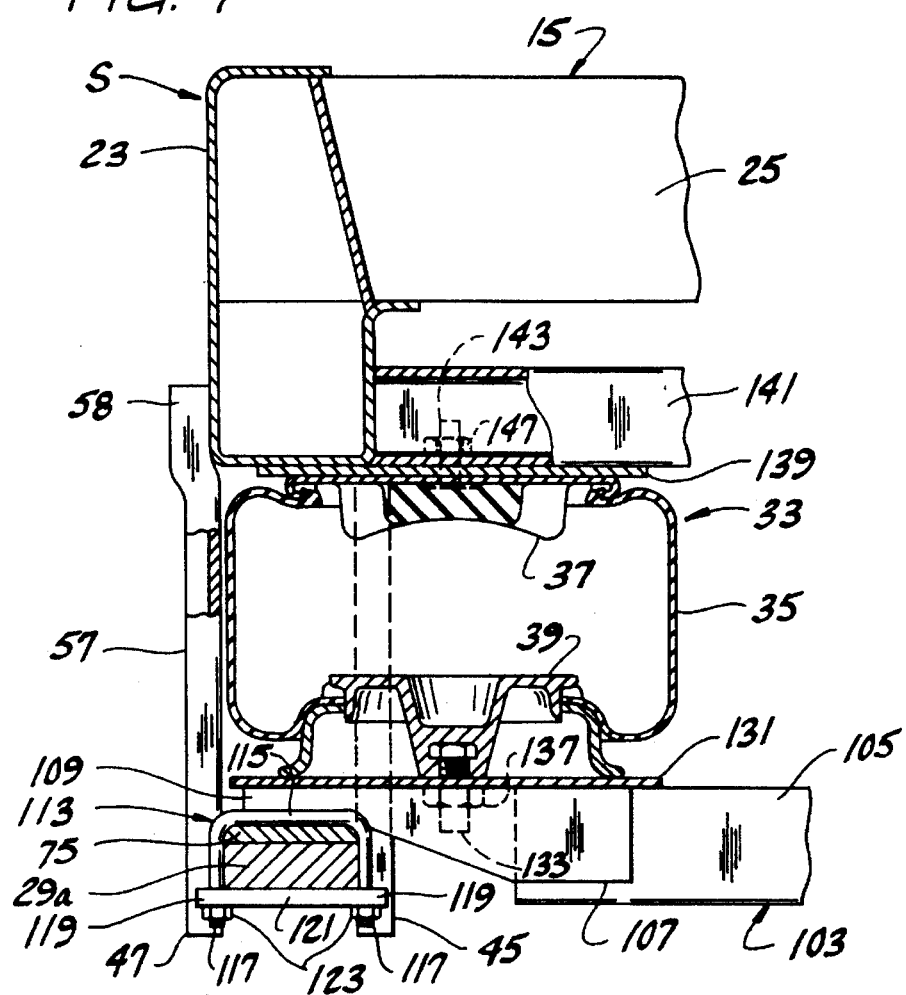
FIG. 7 is an enlarged vertical transverse section on line 7—7 of FIG. 3.

Each suspension comprises a pair of hangers each designated 43 forward of the respective axle 5, one adjacent each side of the bottom of the van extending down from the slider S (and thus extending down below the bottom of the van, the two hangers being coplanar in a vertical transverse plane of the van. Each hanger comprises a pair of side members one of which constitutes an inner side member 45 and the other an outer side member 47 at the inner and outer ends of an upper cross-member or head 49 (see FIG. 6). The latter is formed of a piece of sheet metal bent generally to U-shape in cross-section, thereby having a bottom web 51 and integral flanges each designated 53 extending upward at opposite sides of the web and diverging outwardly and upwardly at a slight angle off vertical. As shown, the web 51 is angled upward and forward off horizontal. Each of the side members 45 and 47 is constituted by a sheet metal plate having side edges such as indicated at 55 and 56 extending down and curving forward, and being outwardly flanged at its said side edges as indicated at 57 for stiffening it. The side plates 45 and 47 are welded to the end edges of the U-shaped head 49 and extend up above the upper edges of the flanges 53 of the head and down below the web 51 of the head. The upper portions of the side plates are slightly offset outwardly from the lower portions of the side plates as indicated at 58. These upper portions 58 of the side plates of the hanger extend up on opposite sides of a respective side member 23 of the slider S and are secured thereto as by welding. The space between the side plates 45 and 47 of each forward hanger 43 is designated 59. Each hanger has a member 61, more particularly a bolt, spanning the space below the web 51 of the head 49 of the hanger, the bolt being at such a distance below the web 51 as to define an opening 63 (see FIG. 6) for receiving the forward end portion of the respective leaf spring 29. The leaf spring extends forward at its forward end through this opening 63 between the web 51 and the bolt 61, which serve to limit the up and down movement of the forward end portion of the leaf spring, and between the side members 45 and 47 of the hanger, which serve to limit the transverse displacement of the forward end portion of the leaf spring. The latter has a downwardly extending finger at its forward end 29f. The arrangement is such that each spring 29 can rock about a generally horizontal axis extending transversely of the van between the web 51 of the head 49 of the of the respective hanger and the bolt 61 of the respective hanger. The left and right hand hangers are braced by a tubular cross-brace 65 extending transversely across the frame, this cross-brace being offset from the bolt in each hanger. The side plates of the hangers have weep holes such as indicated at 67.

Each suspension further comprises a pair of torque arms, one for each leaf spring 29, each of these torque arms being designated 69, each pivoted as indicated at 71 at one end constituting its forward end in a respective hanger 43 for swinging movement above a generally horizontal axis extending transversely with respect to the van adjacent the lower end of the hanger, and pivotally connected as indicated at 73 at its other and rearward end to the respective axle 5 for swinging about a generally horizontal axis parallel to the first-mentioned pivotal axis and extending transversely with respect to the van. Each of these torque arms is preferably an adjustable-length arm like the torque arm shown in FIG. 10 of U.S. Pat. No. 4,871,188.

Each suspension further comprises a pair of elongate plates each designated 75, one on top of the flat rearward half 29a of each leaf spring 29. Each of these top plates 75 has a width generally corresponding to the width of each leaf spring, and is of such length and so disposed on the respective leaf spring as to extend from adjacent the center of length of the spring, more particularly from a point somewhat rearward of the center of length of the spring, toward the rearward end of the spring, more particularly to a point just forward of the rearward end of the spring, with the side edges of each elongate plate 75 generally coplanar with the side edges of the respective spring. As noted above, the rearward half 29a of the spring is flat, and each top plate 75 lies flat on the top of the rearward half of the respective spring. Each plate 75 is clamped on top of the respective leaf spring 29 adjacent the forward end portion of the flat rearward half of the spring in the respective axle/spring securement 31. The latter comprises an upper clamp member 77 having a downwardly opening part-circular seat 79 for seating the axle, and a lower axle clamp member 81 having an upwardly opening part-circular seat 83 for seating the axle. The lower axle clamp member 81 has forward and rearward lugs each designated 85 having holes 87 therein for receiving the threaded shanks 89 of two U-bolts, each designated 91, one forward of and one rearward of the axle. The U-bolts are positioned straddling the top plate 75, the leaf spring 29 and the upper axle clamp member 77 with the head 93 of each bolt engaging the top plate 75 and the threaded shanks 89 of the bolt extending down through the holes 87 in the lugs 85 of the lower axle clamp member 81, nuts 95 being threaded up on the lower ends of the shanks tightly to engage the lugs and thereby tightly clamp the parts together.

The top plate 75 has a first pair and a second pair of recesses 97 (see FIG. 9) at the sides thereof spaced at intervals corresponding to the spacing for the two U-bolts 91, each of these recesses having a curved formation as indicated at 99 (see FIG. 9A) on a radius corresponding to the radius of the inside of the bent portions 101 of the U-bolt at the juncture of the head and each shank of the U-bolt, for enabling seating of the bends in the recesses for engagement of the head of the bolt with the top of the top plate 75 on positioning of the shanks of the bolt contiguous to the sides of the top plate 75. The shanks of each U-bolt extend down from the head of the bolt on the outside of the sides of the respective leaf spring 29 and the sides of the upper axle clamp member 77 and through the holes 87 in the respective lugs 85 of the lower axle clamp member 81, the nuts 95 being threaded up on the shanks firmly to engage the bottoms of the lugs for firm engagement of the head of the bolt with the top plate 75 and tight clamping of the axle 5 between the upper and lower axle clamp members 79 and 81 and tight clamping of the top plate 75 on top of the leaf spring 29.

The lefthand and righthand leaf springs 29 are cross-connected in a transverse plane of the suspension between the axle 5 and the rearward ends of the springs by a cross-beam 103. This beam comprises an elongate member 105 of square tubular shape in cross section having a pair of end plates each designated 107 affixed as by welding to the sides thereof at each end thereof, extending outwardly from the ends of the member 105 and having ends 109 of reduced height bearing on top of the top plate 75 and secured as by welding to top plate 75 adjacent the rearward end of the latter. The top plate 75 is fastened to the respective leaf spring 29 adjacent the rearward end of the leaf spring, more particularly at the respective end of the cross-beam 103 by means comprising a U-bolt 113 straddling the top plate 75 with the head 115 of this U-bolt extending transversely across the top of the top plate and engaging the latter between the ends 109 of the two respective side plate extensions 107 of the cross-beam, the shanks 117 of the U-bolt 113 extending down on opposite sides of the leaf spring 29 through holes 119 in a clamp member 121 extending across and engaging the bottom of the leaf spring, nuts 123 being threaded up on the shanks of the U-bolt tightly against the bottom of clamp member 121 thereby tightly to clamp the top plate 75 adjacent its rear end down tightly on the leaf spring. Thus, bolt 113, clamp member 121 and nuts 123 constitute a fastening system for fastening the rearward ends of the elongate plates on top of the leaf springs adjacent the end portions of the cross-beams. The plate 75 is provided with recesses (like recesses 97) for the bends of the U-bolt.

Each suspension further includes a pair of circular plates each designated 131 secured on top of the cross-beam 103 adjacent the ends thereof, one adjacent each end of the cross-beam, each constituting a bottom plate for respective air bag 33. Each air bag 33 has a threaded stud 133 extending down from the center of its lower head 39 through a center hole in plate 131 into the space between end plates 107 of the cross beam 103, a nut 137 being threaded up on the stud against the bottom of plate 131 for fastening the lower end head of the air bag to the plate 131.

In the manufacture of the suspension, a subassembly of the two plates 75, cross-beam 103 (comprising member 105 and end plates 107) and the two circular plates 131 may be prefabricated, as shown in FIG. 9.

In conjunction with the circular plates 131 for the bottoms of the air bags, the suspension includes a pair of circular plates 139, one adjacent each side of the van below the bottom of the van, for engagement with and by the upper end head 37 of the respective air bag 33. These circular plates 139, which may be referred as top pressure plates for the air bags, have a diameter somewhat greater than the diameter of the upper end head of each air cushion. They are secured as by welding to the bottom of a cross-bar 141 of the slider S. Each air bag is secured at its top to the respective circular plate 139 by a threaded stud 143 which extends up from the upper end head of the air bag through a hole in the circular plate 139 and a nut 147 threaded down on the stud, and further by a threaded air coupling or fitting 149 for supplying the air bag with air under pressure, this coupling extending up from the upper end head of the air bag through a hole in the circular plate and having a nut 151 threaded down thereon, whereby the upper end head and the circular plate 139 are secured together.

Figure 5:
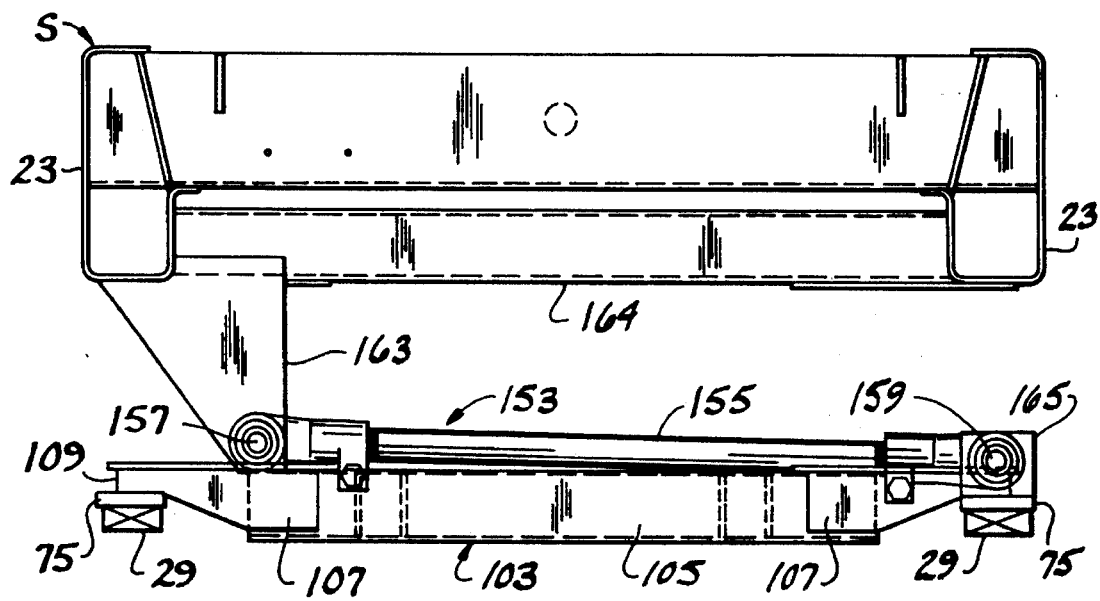
FIG. 5 is a vertical transversal section on line 5—5 of FIGS. 2 and 3.

The suspension further includes means designated in its entirety by the reference numeral 153 for limiting transverse displacement of the leaf springs 75 and up and down movement of these springs, shown in FIGS. 3 and 5 to comprise a torque arm 155 extending transversely with respect to the vehicle below the bottom of the vehicle pivoted at one end as indicated at 157 with respect to the bottom of the vehicle for swinging movement about a first generally horizontal axis which extends longitudinally with respect to the vehicle adjacent one side of the vehicle below the bottom of the vehicle and pivotally connected at its other end as indicated at 159 to the elongate plate 75 on the leaf spring adjacent the other side of the vehicle for swinging movement about a second generally horizontal axis parallel to said first horizontal axis for limiting transverse movement of the leaf springs and supplemental means for limiting up and down movement of the leaf springs comprising shock absorbers such as indicated at 161 interconnected between the slider S and the crossbeam 103. The pivot at 157 is provided by means of a pivot pin extending through a bracket 163 comprising a pair of plates which extend down at one side of the slider S from a cross-bar 164 of the slider and through the respective end of the torque arm 155, and the pivot at 159 is provided by means of a pivot pin extending through a pair of lugs 165 which extend up from the top plate 75 on the leaf spring 29 at the opposite side of the vehicle. The torque arm 155 is swingable up and down in the vertical transverse plane of the axle 5. Arm 155 and shock absorbers 161 constitute a stabilizer system for said leaf springs operable to limit their transverse displacement and their up and down movement.

Figure 11:
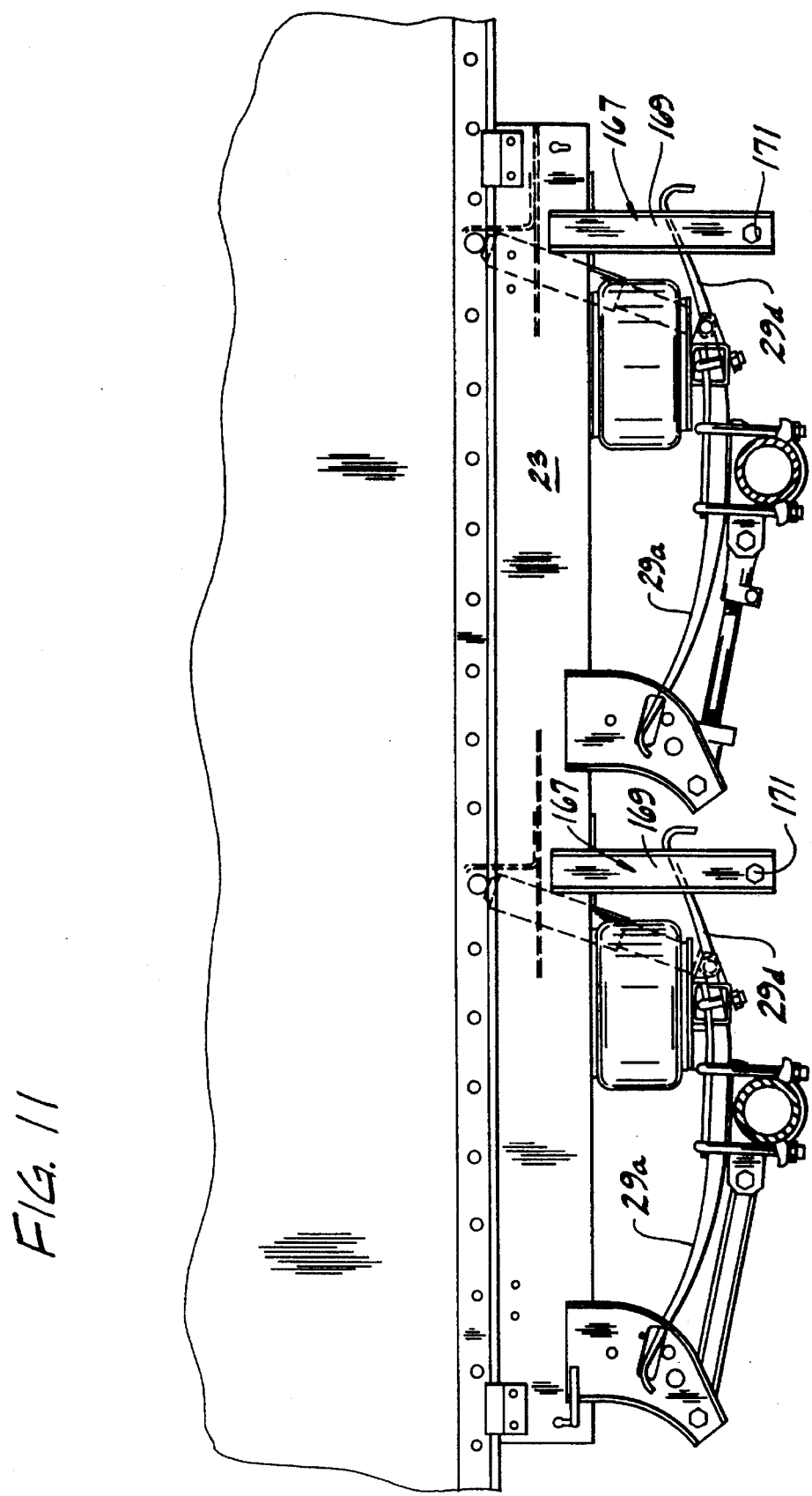
FIG. 11 is a view similar to FIG. 2 showing the second phase of the invention.
Figure 12:
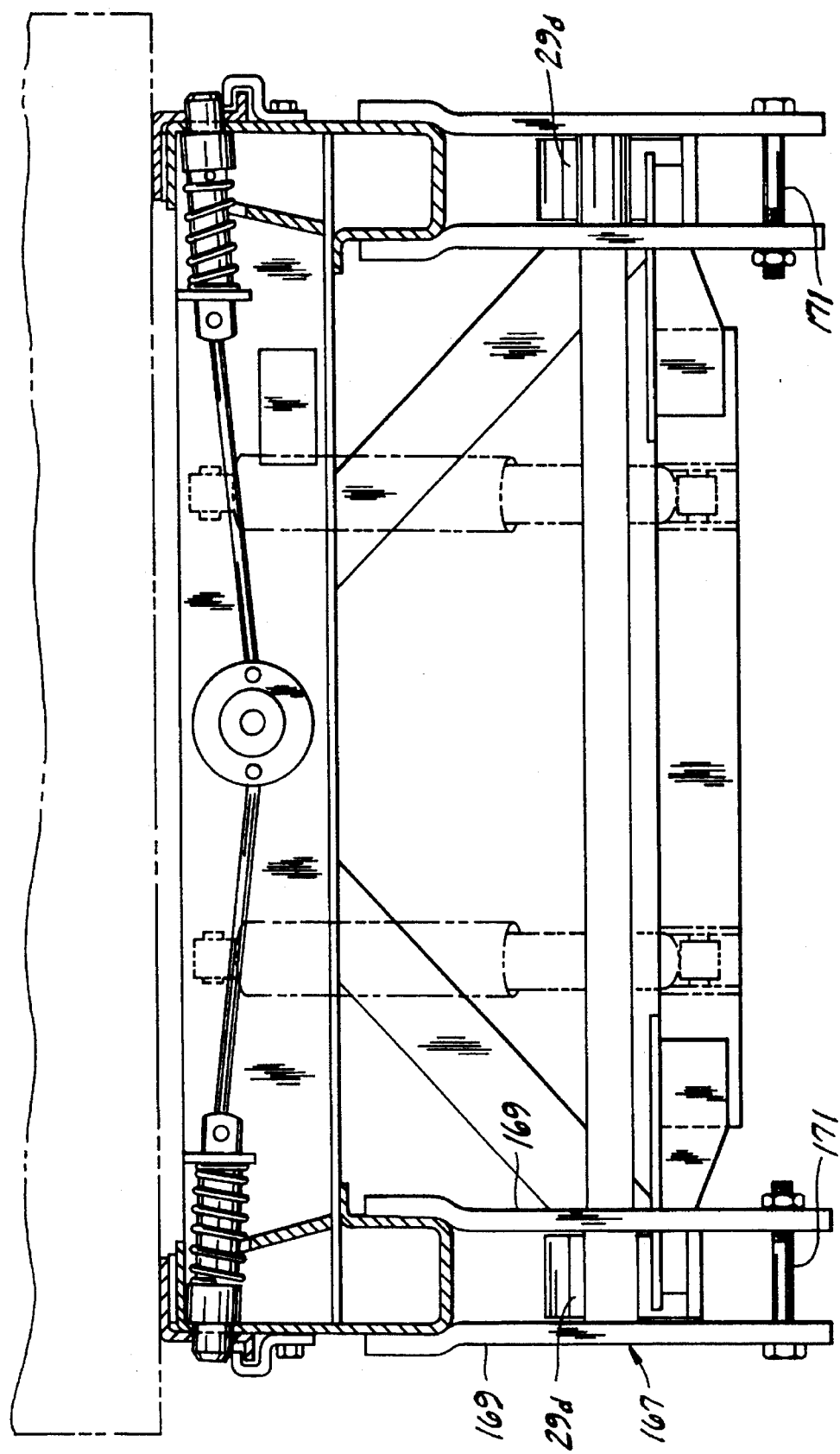
FIG. 12 is a view of the right end of FIG. 11.

FIGS. 11 and 12 show a modification of the suspension involving a different means for limiting transverse displacement of the leaf springs and up and down movement of the leaf springs. In this modification the springs, designated 29A to distinguish them from springs 29, are longer than springs 29, each being having a rearward end portion 29d curving upward from a central flat portion 29e and extending rearward of the air bags. Each spring 29A may be, for example, a commercially available steel leaf spring such as a Low Arch spring sold by Hutchens Industries of Springfield, Mo., e.g. a 363-00 Low Arch single leaf spring or a 385-00 Low Arch 3 leaf H.P. spring. The means for limiting transverse displacement and up and down movement of the springs, generally designated 167, is fixed with respect to the bottom of the vehicle extending down from the bottom of the vehicle in a transverse vertical plane of the vehicle located adjacent the rear ends of the leaf springs and between the air bags and the rear ends of the leaf springs. It limits transverse displacement of the leaf springs while allowing up and down movement of the rearward ends of the leaf springs. More particularly, this means 167 comprises, for each leaf spring, a pair of side guide members each designated 169 extending down from a respective side member 23 of the slider S on opposite sides of the rearward end portion of the respective leaf spring guiding the rearward end of the spring for up and down movement in a vertical plane extending longitudinally of the van adjacent its respective side of the van. Thus, each spring is constrained at its rearward between the respective pair of guide members as it moves up and down thereby limiting its lateral displacement. Extending between the two guide members of each pair adjacent their lower ends is a bolt 171 constituting means for limiting downward travel of the rearward ends of the spring, thereby limiting downward travel of the bottom of the respective air bag or air cushion to prevent it from being over-extended. Shock absorbers may be provided as shown in phantom in FIGS. 11 and 12; they may not be necessary.

FIGS. 13 and 14 show a modification of the means for fastening each top plate 75 to the respective leaf spring 29 adjacent the rearward end of the cross-beam, this modification being preferred when the leaf springs 29 are such that they may be readily provided with a bolt hole without unduly diminishing the strength of the spring, for a bolt for attachment of the respective end of the cross-beam 103 (instead of using the U-bolt 113 as above described). It involves the provision of a bolt hole 173 in the leaf spring 29 adjacent its rearward end and the provision of a bolt hole 175 in the plate 75 these holes being aligned in the assembly of the plate 75 with the leaf spring 29, a bolt 177 being received in the holes with the head 179 of the bolt engaging the bottom of the leaf spring and a nut 181 being threaded down on the upper end of the bolt engaging the top of the plate. The bolt and nut are located between the end plates 107 at the respective end of the cross-beam 103. Each of the circular plates 131 overlies the respective end of the cross-beam member 105 and the cross-beam extensions 107 and has a notch 183 therein as appears in FIG. 9 in line with the bolt and nut fastening means.

In view of the above, it will be seen that several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An air-ride suspension for a vehicle having a bottom, sides and forward and rearward ends, said suspension comprising:

a pair of hangers, one adjacent each side of the vehicle, extending down below the bottom of the vehicle coplanar in a vertical transverse plane of the vehicle, each of said hangers comprising a pair of side members with a space therebetween and an upper and lower member spanning said space defining an opening, a pair of leaf springs, one adjacent each side of the vehicle below the bottom of the vehicle, each spring extending longitudinally with respect to the vehicle and having one end constituting its forward end extending through the opening in a respective hanger;

a pair of elongate plates, one on top of each leaf spring, each of said elongate plates having a width generally corresponding to the width of each leaf spring, and being of such length and so disposed on the respective leaf spring as to overlie a portion of the length of the spring with the side edges of the elongate plate generally coplanar with the side edges of the respective spring;

an axle extending transversely of the vehicle below the bottom of the vehicle having end portions extending below the leaf springs and below forward end portions of said elongate plates;

means for fastening each end portion of the axle to the bottom of the respective leaf spring and fastening said forward end portion of each of said elongate plates on top of the respective leaf spring;

a cross-beam extending transversely of the vehicle below the bottom of the vehicle spanning the leaf springs having end portions bearing on the said elongate plates adjacent the rearward ends of said elongate plates and secured to said elongate plates;

means for fastening the rearward ends of the elongate plates on top of the leaf springs adjacent the end portions of the cross-beam;

a pair of air cushions, one adjacent each side of the vehicle below the bottom of the vehicle, interposed between the cross-beam and the bottom of the vehicle, said cross-beam having secured thereon adjacent the ends thereof a pair of plates, one adjacent each end of the cross-beam, each constituting a bottom plate for the respective air cushion;

a pair of plates, one adjacent each side of the vehicle and carried by the vehicle below the bottom of the vehicle, each constituting a top plate for the respective air cushion;

a pair of torque arms, one adjacent each side of the vehicle, each extending longitudinally with respect to the vehicle and having a forward end and a rearward end, and each extending at its forward end into the space between the side members of a respective forward hanger and pivoted at its forward end therein for swinging movement about a first horizontal axis transverse to the vehicle below the said lower member of the hanger and pivotally connected at its rearward end to the axle for swinging movement about a second horizontal axis parallel to the first; and means for limiting transverse displacement of said leaf springs and up and down movement of said leaf springs.

2. An air-ride suspension as set forth in claim 1 wherein said means for fastening each said end portion of the axle to the bottom of the respective leaf spring and fastening said forward end portion of each said elongate plate on top of the respective leaf spring comprises clamping means including U-bolts straddling the respective elongate plate and leaf spring.

3. An air-ride suspension as set forth in claim 2 wherein each U-bolt has a head and shanks extending down from the ends of the head, each elongate plate having recesses at the sides thereof for receiving the junctures of the head and shanks of each U-bolt for engagement of the head of each U-bolt with the top of the elongate plate.

4. An air-ride suspension as set forth in claim 1 wherein the cross-beam comprises an elongate member having a pair of end plates secured to the sides thereof at each end thereof extending outwardly from the ends of said elongate member lengthwise thereof with a space between said end plates, said end plates bearing on and secured to said elongate plates, said plates for the bottoms of the air cushions being secured on top of said cross-beam end plates and on top of end portions of said elongate cross-beam member, said means for fastening the rearward ends of each elongate plate on top of the respective leaf spring comprising a U-bolt received in the space between the end plates at the respective end of the cross-beam and straddling the respective elongate plate and leaf spring.

5. An air-ride suspension as set forth in claim 4 wherein each U-bolt has a head and shanks extending down from the ends of the head, each elongate plate having recesses at the sides thereof for receiving the junctures of the head and shanks of each U-bolt for engagement of the head of each U-bolt with the top of the elongate plate, 6. An air-ride suspension as set forth in claim 1 wherein the means for limiting transverse displacement of and up and down movement of the leaf springs comprises a torque arm extending transversely with respect to the vehicle below the bottom of the vehicle pivoted at one end with respect to the bottom of the vehicle for swinging movement about a first generally horizontal axis which extends longitudinally with respect to the vehicle adjacent one side of the vehicle below the bottom of the vehicle and pivotally connected at its other end to the elongate plate on the leaf spring adjacent the other side of the vehicle for swinging movement about a second generally horizontal axis parallel to said first horizontal axis for limiting transverse movement of the leaf springs and supplemental means for limiting up and down movement of the leaf springs, 7. An air-ride suspension as set forth in claim 6 wherein said supplemental means comprises a pair of shock absorbers connected between the vehicle and the cross-beam.

8. An air-ride suspension as set forth in claim 7 wherein said transverse torque arm is pivotally connected at its said other end to the elongate plate by means of a pin mounted in a pair of lugs secured to and extending up from the top of the elongate plate.

9. An air-ride suspension as set forth in claim 1 wherein the means for limiting transverse displacement and up and down movement of said leaf springs comprises means fixed with respect to the bottom of the vehicle extending down from the bottom of the vehicle in a transverse vertical plane of the vehicle located adjacent the rear ends of the leaf springs and between the air cushions and the rear ends of the leaf springs for limiting transverse displacement of the leaf springs while allowing up and down movement of the rearward ends of the leaf springs.

10. An air-ride suspension as set forth in claim 9 wherein each air cushion has its bottom secured to the respective bottom plate, the suspension having means associated with said transverse displacement limiting means for the leaf springs for limiting the downward travel of the rearward ends of the leaf springs to limit downward travel of said bottom plates and the bottoms of the air cushions.

11. An air-ride suspension as set forth in claim 9 wherein said fixed transverse displacement limiting means for the leaf springs comprises a pair of spring guide means, one for each leaf spring, each guide means comprising a pair of side guide members extending down from the bottom of the vehicle on opposite sides of the rearward end portion of the respective leaf spring guiding and confining the rearward end portion of the respective leaf spring for up and down movement in a vertical plane extending longitudinally of the vehicle adjacent the respective side of the vehicle.

12. An air-ride suspension as set forth in claim 11 wherein each air cushion has its bottom secured to the respective bottom plate and the suspension has means associated with said transverse displacement limiting means for the leaf springs for limiting the downward travel of the rearward ends of the leaf springs to limit downward travel of said bottom plates and the bottoms of the air cushions.

13. An air-ride suspension as set forth in claim 12 wherein said downward travel limiting means for the rearward ends of the leaf springs comprises a member associated with each guide means extending transversely between the side guide members of each guide means adjacent the lower ends of the side guide members.

14. An air-ride suspension as set forth in claim 1 for a vehicle having a slider on the bottom, the hangers extending down from the slider, the said top plates for the air cushions being secured to the slider, the means for limiting transverse displacement of the leaf springs and up and down movement of the leaf springs being attached to the slider.

15. An air-ride suspension as set forth in claim 10 for a vehicle having a slider on the bottom, the hangers extending down from the slider, the said top and bottom plates for the air cushions being secured to the slider, the leaf spring guide members extending down from the slider.

16. An air-ride suspension as set forth in claim 1 wherein the cross-beam comprises an elongate member having a pair of end plates secured to the sides thereof at each end thereof extending outwardly from the ends of said elongate member lengthwise thereof with a space between said end plates, said end plates bearing on and secured to said elongate plates, said plates for the bottoms of the air cushions being secured on top of said cross-beam end plates and on top of end portions of said elongate cross-beam member, said means for fastening the rearward ends of each elongate plate on top of the respective leaf spring comprising a bolt extending through a bolt hole in the leaf spring and a bolt hole in the elongate plate and a nut threaded on the bolt, the bolt and nut being located between the end plates at the respective end of the cross-beam.

17. An air-ride suspension as set forth in claim 1 wherein, as to each spring, its rearward half is flat and its forward half is curved upwardly, each of said elongate plates lying flat on top of said flat rearward half of the respective spring and extending from adjacent the center of length of the spring to a point adjacent the rearward end of the spring.

18. An air-ride suspension for a vehicle having a bottom, sides and forward and rearward ends, said suspension comprising:

- a pair of hangers, one adjacent each side of the vehicle, extending down below the bottom of the vehicle coplanar in a vertical transverse plane of the vehicle, each of said hangers comprising a pair of side members with a space therebetween and an upper and lower member spanning said space defining an opening,
- a pair of leaf springs, one adjacent each side of the vehicle below the bottom of the vehicle, each spring extending longitudinally with respect to the vehicle and having one end constituting its forward end extending through the opening in a respective hanger;
- a pair of elongate plates, one on top of each leaf spring, each of said elongate plates having a width generally corresponding to the width of each leaf spring, and being of such length and so disposed on the respective leaf spring as to overlie a portion of the length of the spring with the side edges of the elongate plate generally coplanar with the side edges of the respective spring;
- an axle extending transversely of the vehicle below the bottom of the vehicle having end portions extending below the leaf springs and below forward end portions of said elongate plates;
- a fastening system for fastening each end portion of the axle to the bottom of the respective leaf spring and fastening said forward end portion of each of said elongate plates on top of the respective leaf spring;
- a cross-beam extending transversely of the vehicle below the bottom of the vehicle spanning the leaf springs having end portions bearing on the said elongate plates adjacent the rearward ends of said elongate plates and secured to said elongate plates;
- a fastening system for fastening the rearward ends of the elongate plates on top of the leaf springs adjacent the end portions of the cross-beams;
- a pair of air cushions, one adjacent each side of the vehicle below the bottom of the vehicle, interposed between the cross-beam and the bottom of the vehicle,
- said cross-beam having secured thereon adjacent the ends thereof a pair of plates, one adjacent each end of the cross-beam, each constituting a bottom plate for the respective air cushion;
- a pair of plates, one adjacent each side of the vehicle and carried by the vehicle below the bottom of the vehicle, each constituting a top plate for the respective air cushion;
- a pair of torque arms, one adjacent each side of the vehicle, each extending longitudinally with respect to the vehicle and having a forward end and a rearward end, and each extending at its forward end into the space between the side members of a respective forward hanger and pivoted at its forward end therein for swinging movement about a first horizontal axis transverse to the vehicle below the said lower member of the hanger and pivotally connected at its rearward end to the axle for swinging movement about a second horizontal axis parallel to the first; and
- a stabilizer system for said leaf springs operable to limit their transverse displacement and their up and down movement.

* * * * *